(12) United States Patent
Robert Jose et al.

(10) Patent No.: US 12,027,169 B2
(45) Date of Patent: *Jul. 2, 2024

(54) SYSTEMS AND METHODS FOR PROVIDING VOICE COMMAND RECOMMENDATIONS

(71) Applicant: Rovi Guides, Inc., San Jose, CA (US)

(72) Inventors: Jeffry Copps Robert Jose, Tamil Nadu (IN); Ankur Aher, Maharashtra (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/139,771

(22) Filed: Apr. 26, 2023

(65) Prior Publication Data

US 2023/0260514 A1 Aug. 17, 2023

Related U.S. Application Data

(63) Continuation of application No. 16/709,734, filed on Dec. 10, 2019, now Pat. No. 11,676,586.

(51) Int. Cl.
*G10L 15/22* (2006.01)
*G06F 3/14* (2006.01)
*G06F 3/16* (2006.01)

(52) U.S. Cl.
CPC ............ *G10L 15/22* (2013.01); *G06F 3/14* (2013.01); *G06F 3/165* (2013.01); *G06F 3/167* (2013.01);
(Continued)

(58) Field of Classification Search
CPC ..... G10L 15/32; G10L 15/1815; G10L 15/22; G10L 15/30; G10L 25/51;
(Continued)

(56) References Cited

U.S. PATENT DOCUMENTS 6,226,749 B1 * 5/2001 Carloganu ............ G06F 21/606
726/2
6,408,272 B1 * 6/2002 White ..................... G10L 15/30
704/E15.047
(Continued)

FOREIGN PATENT DOCUMENTS

JP 2020009439 A * 1/2020 ............. C08J 9/149
JP 2020009439 A 1/2020
(Continued)

OTHER PUBLICATIONS

McRoberts, Sarah , et al., "Exploring Interactions with Voice-Controlled TV", May 14, 2019 (May 14, 2019), pp. 1-11, XP055790070.

*Primary Examiner* — Mohammad K Islam
(74) *Attorney, Agent, or Firm* — Haley Guiliano LLP

(57) ABSTRACT

The system provides a voice command recommendation to a user to avoid a non-voice command. The system determines a command that is expected to be received, and generates a voice command recommendation that corresponds to the predicted command. The predicted command can be based on the user's behavior, a plurality of users' behavior, environmental circumstances such as a phone call ring, or a combination thereof. The system may access one or more databases to determine the predicted command. The voice command recommendation may include a displayed notification that describes the recommended voice command, and exemplary voice inputs that are recognized. The system also activates an audio interface, such as a microphone, that is configured to receive a voice input. If the system receives a recognizable voice input at the audio interface that corresponds to the recommendation, the system performs the predicted command in response to receiving the voice input.

20 Claims, 5 Drawing Sheets

(52) U.S. Cl.
CPC .. *G10L 2015/223* (2013.01); *G10L 2015/228* (2013.01)

(58) Field of Classification Search
CPC ......... G10L 2015/223; G10L 2015/228; G06F 3/14; G06F 3/165; G06F 3/167; H04N 5/232; H04N 13/25; H04N 5/225; H04N 13/02; H04R 1/10
See application file for complete search history.

(56) References Cited

U.S. PATENT DOCUMENTS

| | | | | |
|---|---|---|---|---|
| 6,836,760 | B1* | 12/2004 | Bellegarda | G10L 15/1822 704/238 |
| 7,346,515 | B2* | 3/2008 | Mizutani | G10L 15/22 704/E15.04 |
| 8,515,736 | B1* | 8/2013 | Duta | G06F 40/30 704/9 |
| 8,533,760 | B1* | 9/2013 | Lakin | H04N 21/6125 348/388.1 |
| 8,761,373 | B1* | 6/2014 | Raghavan | H04M 3/4936 704/270.1 |
| 8,838,434 | B1* | 9/2014 | Liu | G06F 40/58 704/7 |
| 8,983,840 | B2* | 3/2015 | Deshmukh | G10L 21/10 707/750 |
| 9,131,369 | B2* | 9/2015 | Ganong, III | G10L 15/30 |
| 9,378,601 | B2* | 6/2016 | Ricci | H04L 67/12 |
| 9,405,832 | B2* | 8/2016 | Edwards | G06F 16/951 |
| 9,484,021 | B1* | 11/2016 | Mairesse | G10L 15/08 |
| 9,514,747 | B1* | 12/2016 | Bisani | G10L 25/60 |
| 9,607,617 | B2* | 3/2017 | Hebert | G10L 15/22 |
| 9,619,459 | B2* | 4/2017 | Hebert | G06F 16/90332 |
| 9,652,109 | B2* | 5/2017 | Borzello | G06F 3/0482 |
| 9,652,797 | B2* | 5/2017 | Vijayaraghavan | G06F 16/951 |
| 9,966,065 | B2* | 5/2018 | Gruber | G10L 15/28 |
| 10,018,977 | B2* | 7/2018 | Cipollo | H04Q 9/00 |
| 10,388,277 | B1* | 8/2019 | Ghosh | G10L 15/1822 |
| 10,467,792 | B1* | 11/2019 | Roche | G06F 40/20 |
| 10,521,189 | B1* | 12/2019 | Ryabov | G06F 40/117 |
| 10,885,091 | B1* | 1/2021 | Meng | G06F 16/24578 |
| 10,896,679 | B1* | 1/2021 | Hu | G06N 3/08 |
| 2005/0278093 | A1* | 12/2005 | Kameyama | B60R 16/0373 701/49 |
| 2006/0025995 | A1* | 2/2006 | Erhart | G10L 15/1822 704/239 |
| 2006/0149544 | A1* | 7/2006 | Hakkani-Tur | G10L 15/22 704/E15.04 |
| 2010/0268536 | A1* | 10/2010 | Suendermann | G10L 15/22 704/E15.008 |
| 2010/0332234 | A1* | 12/2010 | Agapi | G10L 15/22 704/E15.04 |
| 2013/0151250 | A1* | 6/2013 | VanBlon | G10L 15/30 704/235 |
| 2013/0159000 | A1* | 6/2013 | Ju | G10L 15/1822 704/E15.005 |
| 2013/0326353 | A1* | 12/2013 | Singhal | G06F 16/683 715/728 |
| 2014/0039899 | A1* | 2/2014 | Cross, Jr. | G10L 15/193 704/275 |
| 2014/0049691 | A1* | 2/2014 | Burdzinski | H04N 21/41265 348/563 |
| 2014/0058732 | A1* | 2/2014 | Labsky | G10L 15/30 704/E15.005 |
| 2014/0168277 | A1* | 6/2014 | Ashley | G06F 3/1446 345/672 |
| 2014/0207442 | A1* | 7/2014 | Ganong, III | H04W 12/02 704/201 |
| 2014/0368734 | A1* | 12/2014 | Hoffert | H04N 21/47 348/564 |
| 2015/0012271 | A1* | 1/2015 | Peng | G10L 15/08 704/235 |
| 2015/0120288 | A1* | 4/2015 | Thomson | G10L 15/22 704/231 |
| 2015/0120296 | A1* | 4/2015 | Stern | G10L 15/30 704/236 |
| 2015/0279352 | A1* | 10/2015 | Willett | G10L 15/30 704/231 |
| 2015/0348548 | A1* | 12/2015 | Piernot | G06F 3/013 704/235 |
| 2015/0366518 | A1* | 12/2015 | Sampson | A61B 5/7264 600/509 |
| 2016/0012819 | A1* | 1/2016 | Willett | G10L 15/1815 704/240 |
| 2016/0104486 | A1* | 4/2016 | Penilla | G10L 15/02 704/232 |
| 2016/0379626 | A1* | 12/2016 | Deisher | G10L 15/197 704/235 |
| 2017/0097618 | A1* | 4/2017 | Cipollo | G10L 15/22 |
| 2017/0177716 | A1* | 6/2017 | Perez | G06F 40/30 |
| 2017/0188168 | A1* | 6/2017 | Lyren | H04S 7/305 |
| 2017/0213546 | A1* | 7/2017 | Gilbert | G06F 40/30 |
| 2017/0213550 | A1* | 7/2017 | Ali | G10L 15/20 |
| 2017/0236512 | A1* | 8/2017 | Williams | G06F 3/165 381/79 |
| 2017/0263253 | A1* | 9/2017 | Thomson | G10L 15/22 |
| 2017/0278511 | A1* | 9/2017 | Willett | G10L 25/84 |
| 2017/0278514 | A1* | 9/2017 | Mathias | G06F 16/35 |
| 2017/0294184 | A1* | 10/2017 | Bradley | G10L 25/18 |
| 2017/0359626 | A1* | 12/2017 | Chen | H04N 21/4667 |
| 2018/0018959 | A1* | 1/2018 | Des Jardins | G10L 15/08 |
| 2018/0060326 | A1* | 3/2018 | Kuo | G06F 16/9535 |
| 2018/0061403 | A1* | 3/2018 | Devaraj | G06F 3/167 |
| 2018/0061404 | A1* | 3/2018 | Devaraj | G10L 15/22 |
| 2018/0139565 | A1* | 5/2018 | Norris | H04S 1/007 |
| 2018/0197545 | A1* | 7/2018 | Willett | G10L 15/005 |
| 2018/0211663 | A1* | 7/2018 | Shin | G10L 15/1815 |
| 2018/0211668 | A1* | 7/2018 | Willett | G10L 15/30 |
| 2018/0233141 | A1* | 8/2018 | Solomon | A61B 5/0507 |
| 2018/0247065 | A1* | 8/2018 | Rhee | G06F 21/32 |
| 2018/0268818 | A1* | 9/2018 | Schoenmackers | G06F 40/35 |
| 2018/0308477 | A1* | 10/2018 | Nagasaka | G08C 17/02 |
| 2018/0308480 | A1 | 10/2018 | Jang et al. | |
| 2018/0314689 | A1* | 11/2018 | Wang | G10L 15/1822 |
| 2018/0330728 | A1* | 11/2018 | Gruenstein | G10L 17/00 |
| 2019/0027147 | A1* | 1/2019 | Diamant | G10L 15/22 |
| 2019/0043509 | A1* | 2/2019 | Suppappola | G10L 17/04 |
| 2019/0043529 | A1* | 2/2019 | Muchlinski | G10L 15/22 |
| 2019/0057693 | A1* | 2/2019 | Fry | G10L 15/26 |
| 2019/0066677 | A1 | 2/2019 | Jaygarl et al. | |
| 2019/0103101 | A1* | 4/2019 | Danila | G10L 15/30 |
| 2019/0180744 | A1* | 6/2019 | Lee | G10L 15/16 |
| 2019/0279633 | A1* | 9/2019 | Venkata | G06F 3/167 |
| 2019/0295552 | A1* | 9/2019 | Pasko | G10L 15/30 |
| 2019/0311718 | A1* | 10/2019 | Huber | H04R 27/00 |
| 2019/0371307 | A1* | 12/2019 | Zhao | G10L 15/26 |
| 2020/0013410 | A1* | 1/2020 | Bond | G10L 17/06 |
| 2020/0037073 | A1* | 1/2020 | Augst | H04R 3/04 |
| 2020/0077892 | A1* | 3/2020 | Tran | A61B 5/1117 |

FOREIGN PATENT DOCUMENTS

| | | | | |
|---|---|---|---|---|
| KR | 20170078788 A | * | 11/2015 | ............. G10L 25/51 |
| KR | 20170078788 A | | 7/2017 | |
| WO | 2017073227 A1 | | 5/2017 | |
| WO | WO-2017073227 A1 | * | 5/2017 | ............... G06F 3/01 |

* cited by examiner

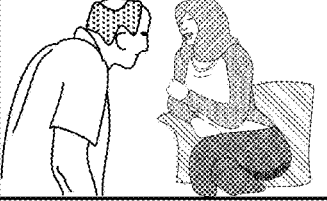
FIG. 1

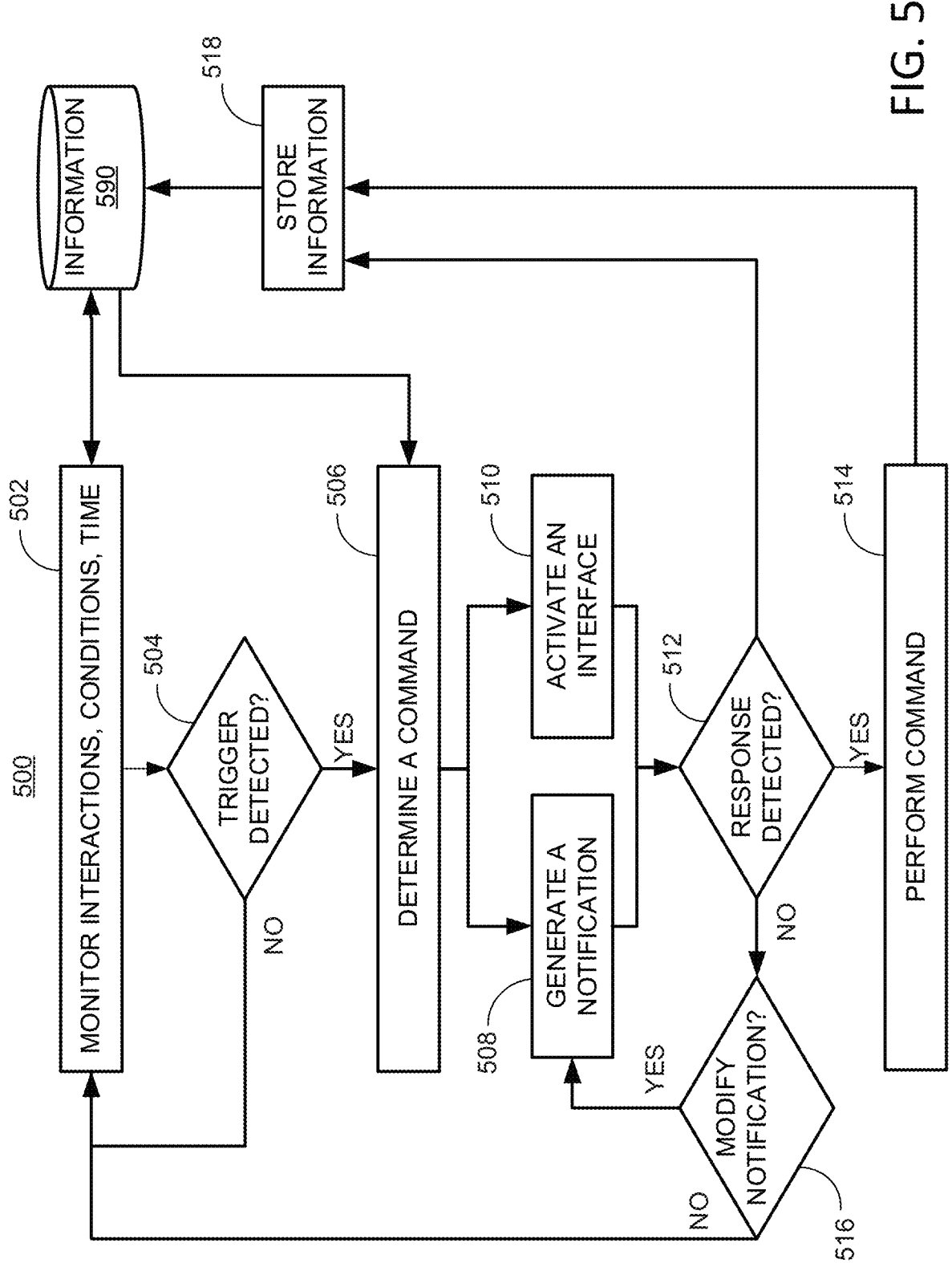

SYSTEMS AND METHODS FOR PROVIDING VOICE COMMAND RECOMMENDATIONS

CROSS-REFERENCE TO RELATED APPLICATION

This application is a continuation of U.S. patent application Ser. No. 16/709,734, filed Dec. 10, 2019, the disclosure of which is hereby incorporated by reference herein in its entirety.

BACKGROUND

The present disclosure relates to systems for generating voice command recommendations, and more particularly to systems for generating voice command recommendations based on predicted interactions.

SUMMARY

Conversation systems have made interactions between entertainment systems and users easy and comfortable. However, in some circumstances and for various reasons, users still choose alternate ways to interact with the system other than voice commands. For example, users typically interact with the system using remote controllers and it may be difficult to change such habits of users. In a further example, users might not be aware that a particular interactive function can be achieved with the system by using voice commands. In a further example, users may not know or remember the exact command to execute a particular interactive function.

The present disclosure describes systems and methods for identifying situations which are most convenient for a user to use voice commands instead of using remote controllers, and then suggest appropriate voice commands to the user. In some embodiments, the system predicts that the user will be imminently interacting with the system, based on history of the user's behavior and profile information, based on environmental cues, or based on any other suitable inputs or combination of inputs. The system constructs a suggestion for a voice command, displays the suggestion to the user, and prepares an audio interface or device, such as a microphone, to receive audio input. In response, the user can provide a voice command. If the voice command corresponds to the suggestion, the system will perform the interactive function.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 1 shows two illustrative displays including generated voice commands, in accordance with some embodiments of the present disclosure;

FIG. 5 shows a flowchart of an illustrative process for managing voice command interactions, in accordance with some embodiments of the present disclosure.

DETAILED DESCRIPTION

Figure 2:
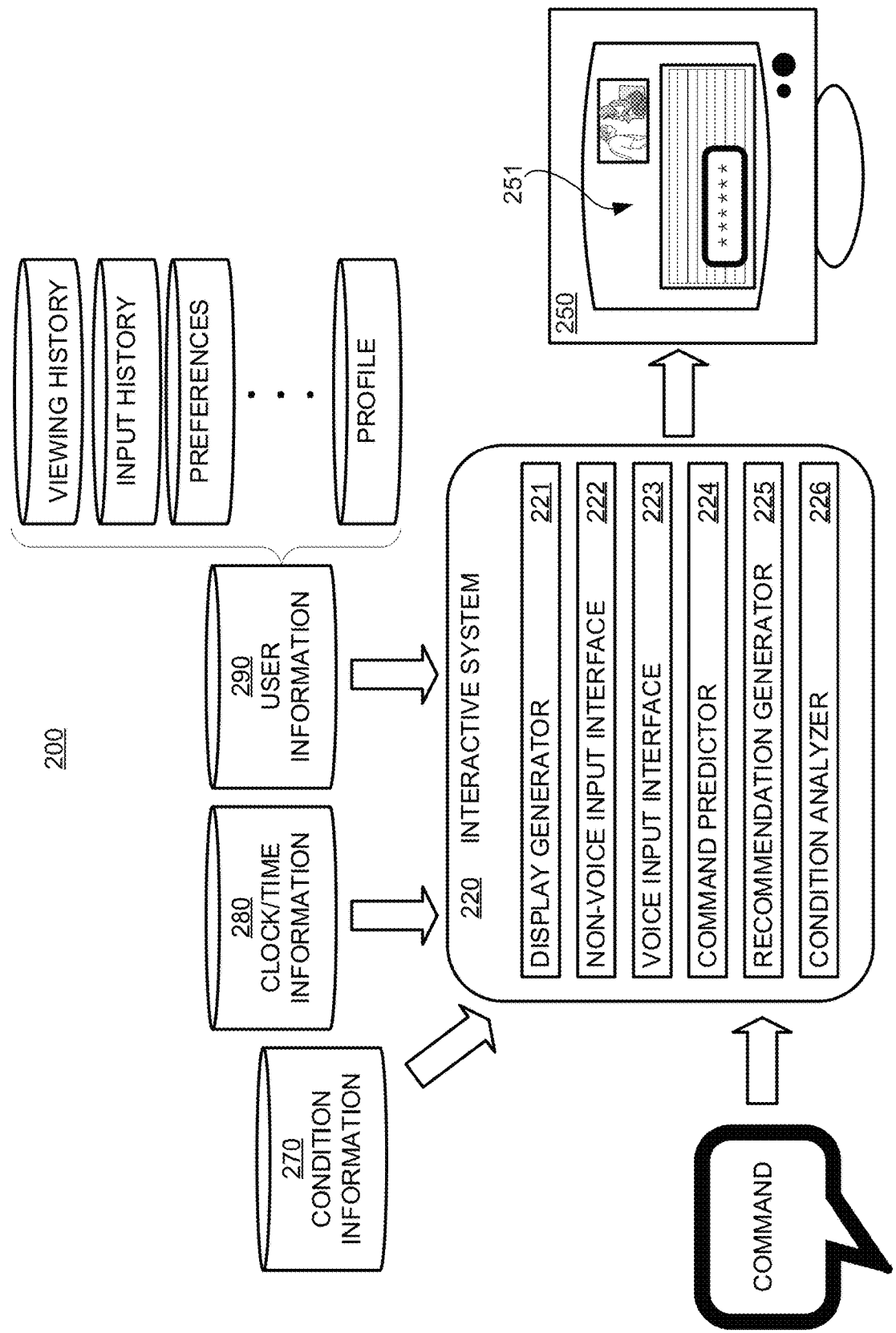
FIG. 2 is a block diagram of an illustrative system for generating voice command recommendations, in accordance with some embodiments of the present disclosure.

The present disclosure describes systems and methods for identifying the most convenient time and circumstance for a user to use voice commands instead of using remote controllers, and then suggest appropriate voice commands to the user. This functionality will help the system to be more assistive to the user by requiring minimal efforts for any interactive function. This functionality will help the user to understand the usage and advantages of a conversation system.

In illustrative example, a user is currently watching some latest sitcom episode on channel HBO. As part of a usual routine, after the sitcom ends, the user changes the channel to Sky News to watch a news program. Generally, user changes the channel using a remote control. If the remote control is not in the vicinity of the user and is out of reach for the user to grab it, the system of the present disclosure identifies this situation. The system predicts based on the user's history that the user wants to change the channel to Sky News as the sitcom ends. The system also detects that user cannot easily grab the TV remote control to change the channel In response, the system identifies this opportunity to notify user of the voice command that can be used to change the channel. The system displays a notification on the television display such as "To change channel just say— Tune to Sky News." The system also activates a microphone to receive the voice command. Accordingly, if the user speaks a voice command as suggested by the notification, the system proceeds to change the channel.

FIG. 1 shows illustrative displays 100 and 150, which include generated voice commands, in accordance with some embodiments of the present disclosure. For example, displays 100 and 150 may be generated on a television screen, computer monitor, user device screen (e.g., a touch-screen of a mobile phone), or any other suitable display device. A system configured to generate displays 100 and 150 identifies optimal times to provide a voice command suggestion as a notification to the user. The system may take into account that the desired interactive function will be difficult to achieve for the user by any other means apart from voice command, or otherwise that a voice command suggestion may be useful to the user. Thus, the system improves the chances that user will use a voice command.

Display 100, as illustrated includes a grid of program identifiers with the vertical axis defined by channel (e.g., or station) and the horizontal axis defined by predetermined display time. For example, time slots ranging from 8:00 μm to 10:00 pm are illustrated for seven channels. The current clock time as illustrated in display 100 is 8:59 pm, with the cursor highlighting the program "NCIS: Los Angeles." The system identifies that it is almost 9:00 pm on Friday, and that the user typically switches to channel 8 to watch "Midsomer Murders" on PBS. The system generates notification 101, which indicates to the user the predicted command that they are likely to provide, and also includes an indication "Say, YES" of how the user can provide that command as a voice command. When the system generates notification 101, the system also activates a microphone to receive the voice command should the user choose to provide voice input. If the user responds with a voice command of "Yes," the system will perform the channel change command (e.g., changing the channel to PBS). If the user does not respond (e.g., within some predetermined time) with the recommended voice command, the system does not perform any action (e.g., and may cease displaying notification 101 after some predetermined time period).

Display 150, as illustrated includes a grid of program identifiers with the vertical axis defined by channel (e.g., or station) and the horizontal axis defined by predetermined display time. For example, time slots ranging from 8:00 μm to 10:00 pm are illustrated for seven channels. The current clock time as illustrated in display 150 is 8:38 pm, with the cursor highlighting the program "NCIS: Los Angeles." At 8:38 pm, the system identifies an environmental event such as a phone call, smart doorbell ring, or reduced proximity of the user to the system or remote control. The system generates notification 151, which a predicted command of pausing the program, and also includes an indication "Say, YES" of how the user can provide that command as a voice command. When the system generates notification 151, the system also activates a microphone to receive the voice command should the user choose to provide voice input. If the user responds with a voice command of "Yes," the system will pause playback of the current program. If the user does not respond (e.g., within some predetermined time) with the recommended voice command, the system does not perform any action (e.g., and may cease displaying notification 151 after some predetermined time period, or repeat the notification at a later time).

FIG. 2 is a block diagram of illustrative system 200 for generating voice command recommendations, in accordance with some embodiments of the present disclosure. System 200 includes interactive system 220, condition information 270, clock/time information 280, user information 290, and display device 250. Interactive system 220, as illustrated, includes display generator 221, non-voice input interface 222, voice input interface 223, command predictor 224, recommendation generator 225, and condition analyzer 226. Interactive system 220 detects the interactive function needed, or likely needed, by the user and notifies the user of a corresponding voice command. The notification may be displayed on the television screen (e.g., a primary screen) or on a peripheral device such as a mobile phone screen (e.g., a secondary screen). In an illustrative example, system 200 is configured to (1) predict an imminent user-interaction with non-voice input interface 222 or voice input interface 223 using command predictor 224, (2) identify that the predicted interaction will be difficult to achieve using an interactive device (say remote controller) for the user at that time using condition analyzer 226, and (3) notify the user with a displayed recommendation of an appropriate voice command for the interactive function by displaying it on the system screen using display generator 221. In a further illustrative example, system 200 is configured to (1) predict an imminent user-interaction with non-voice input interface 222 based on user behavior using command predictor 224, (2) generate a recommendation for a voice command to achieve the user-interaction using recommendation generator 225, (3) notify the user with a displayed recommendation of an appropriate voice command for the interactive function by displaying it on the system screen using display generator 221, and (4) activate voice input interface 223 to receive voice input. In a further illustrative example, system 200 is configured to (1) predict an imminent action to be performed based on one or more users' behavior using command predictor 224, (2) generate a recommendation using recommendation generator 225 for a voice command to achieve the action using display generator 221, and (4) activate voice input interface 223 to receive voice input.

Condition information 270 includes information about conditions that may affect a user's use of voice commands. Condition information 270 may include current information, historical information, statistical information, or any combination thereof for one or more users. For example, condition information may include position information (e.g., historical position information, current position information, or both), events (e.g., logs or a current instance of a phone ringing, a doorbell ringing, a device interaction, an alarm), any other suitable information, or any combination thereof. For example, condition information 270 may include information about when content is consumed on a mobile phone or other interactive device. In some embodiments, condition information 270 includes information about other users in proximity to the first user. In some embodiments, condition information 270 is included as part of interactive system 220. For example, information of condition information 270 may be stored in memory storage of interactive system 220, and accordingly may be retrieved based on one or more criteria. In some embodiments, as illustrated, condition information 270 need not be included as part of interactive system 220, and be implemented on hardware of a separate device or system that is communicatively coupled (e.g., via a wired, wireless, or optical network) to interactive system 220.

Clock/time information 280 includes information such as, for example, a current clock time, a clock time associated with a user command or other input, a display time of a program (e.g., start time, end time, or duration), program schedules, any other temporal information, or any combination thereof. Clock/time information 280 is stored in any suitable memory on any suitable device or combination of devices. In some embodiments, for example, clock/time information 280 is determined by control circuitry. The time may be based on an oscillator circuit (e.g., a "real time clock" or RTC), a time communicated from a network entity (e.g., to calibrate a software clock), a clock implemented in hardware and/or software, any other suitable time reference, or any combination thereof. In some embodiments, clock/time information 280 includes historical temporal information for one or more users such as, for example, time a user command was inputted (e.g., times when a currently viewed channel is changed), viewing times (e.g., start time, end time, duration), any other suitable temporal information, or any combination thereof. For example, clock/time information 280, or a portion thereof, may be stored as a time stamp or other suitable time indicator accompanying data stored in user information 290. Accordingly, user information 290 may be combined with at least some of clock/time information 280.

User information 290 may include user identification information (e.g., name, an identifier, address, contact information), user command history such as previous voice commands or previous remote control commands, user preferences (e.g., search settings, favorite media content, temporal viewing preferences), user likes/dislikes (e.g., user-inputted information, user selections), user voice data (e.g., audio samples, signatures, speech patterns, or files for identifying the user's voice), any other suitable information about a user, or any combination thereof. User information 290 include any suitable information for predicting a voice command that may be useful to the user based on their past behavior and profile information. In some embodiments, user information 290 may be included in one or more databases. In some embodiments, user information 290 include statistical information for a plurality of users (e.g., search histories, content consumption histories, consumption patterns), a plurality of entities (e.g., content associated with entities, metadata, static types), or both. For example, user information 290 may include information about a plurality of users' behavior, selected commands, voice commands, remote control commands, any other suitable information, or any combination thereof. In some embodiments, user information 290 is included as part of interactive system 220. For example, information of user information 290 may be stored in memory storage of interactive system 220, and accordingly may be retrieved based on one or more criteria. In some embodiments, as illustrated, user information 290 need not be included as part of interactive system 220, and be implemented on hardware of a separate device or system that is communicatively coupled (e.g., via a wired, wireless, or optical network) to interactive system 220. In an illustrative example, user information 290 may store any suitable interaction information, as illustrated in Table 1:

TABLE 1

Record of various interactive functions used by user

| INTER-ACTIVE FUNCTION | NO. OF TIMES USING REMOTE | LAST USAGE TIMESTAMP VIA HANDHELD REMOTE | NO. OF TIMES USING VOICE | LAST USAGE TIMESTAMP VIA VOICE COMMAND |
|---|---|---|---|---|
| Channel change | 1945 | 2019 Aug. 6 | 0 | — |
| Mute | 122 | 2019 Jul. 4 | 3 | 2018 Nov. 2 01:34:07 |
| Open App | 411 | 2019 Jun. 1 | 7 | 2019 Jan. 6 14:19:55 |
| Volume change | 1545 | 2019 Aug. 6 | 1 | 2018 Aug. 2 22:08:37 |
| ... | ... | ... | ... | ... |

As illustrated in Table 1, interactions such as channel changes, volume adjustments, and other commands may be stored, along with frequency and date./time, in user information 290. In some embodiments, user information 290 stores records for other interactive devices apart from a TV remote such as, for example, a game controller/console, a keyboard, a trackball, a mobile phone, or any other device (s), and use the stored values to determine whether to provide a voice command notification. In some embodiments, user information 290 is combined with condition information 270 (e.g., stored in a common database(s)). For example, although not shown in Table 1, position information of a user, a device, or both, may also be included in such a record.

Display generator 221 is configured to generate a display on display device 250 (e.g., a television screen, computer monitor, or smartphone touchscreen). In some embodiments, system 200 includes or is coupled to display device 250, which is configured to provide a visual display (e.g., display 251) of information to the user. In an illustrative example, display 251 may be, but need not be, similar to displays 100 and 150 of FIG. 1. In some embodiments, display generator 221 determines display parameters to determine how to organize, arrange, configure, or otherwise present information. Display parameters may include, for example, screen size, zoom extent, pixel count or resolution, available colors or color palette, placement and properties of overlays (e.g., notification windows), user preferences, any other suitable parameters for generating a display, or any combination thereof. In some embodiments, display device 250 provides required or suggested display parameters to display generator 221. In some embodiments, interactive system 220 (e.g., or display generator 221 thereof) includes a software driver or other software having display parameters for generating a display (e.g., on display device 250 or any other suitable display device). For example, interactive system 220 or display generator 221 thereof may include a graphics card or other suitable hardware controller that determines display parameters based on properties of the display device (e.g., display device 250) and the information to be displayed on the display device (e.g., display 251 to be displayed on display device 250). In some embodiments, depending on the display type, size and layout, display generator 221 modifies a pitch, size, level of detail, or other aspect of a displayed grid. In an illustrative example, display generator 221 generates a displayed grid on display device 250. In some embodiments, interactive system 220 or display generator 221 thereof transmits video data to display device 250 to generate display 251. Display 251 may include content identifiers, content descriptions, time indicators, a cursor, a current time (e.g., a clock time), notifications, any other suitable features, or any combination thereof. For example, interactive system 220 or display generator 221 thereof may transmit a high-definition multimedia interface (HDMI) signal to display device 250, over a suitable cable or connection, to generate a grid including the episode identifiers (e.g., similar to displays 100 and 150 of FIG. 1, or display 251 of FIG. 2). In some embodiments, interactive system 220 or display generator 221 thereof may update an existing display on display device 250. For example, a first display may be presented on display device 250, and interactive system 220 or display generator 221 thereof may update the first display to a second display by transmitting a video signal having some portions updated and some portions similar or maintained as before. In some embodiments, interactive system 220 or display generator 221 thereof generates a grid for display that is configured to fit into a target space on display device 250.

Non-voice input interface 222 may include any suitable interface such as, for example, a receiver for receiving signals from a handheld remote control, hard buttons (e.g., switches, push-buttons, or any other suitable user-actuated buttons), a touchscreen (e.g., with soft buttons or other selectable or adjustable elements), a keypad (e.g., with a preset layout for entering text commands), any other suitable interface that does not process voice input, or any combination thereof. Non-voice input interface 222 requires a non-voice interaction which may include a haptic action by the user (e.g., touching an area on a screen or pressing a button).

Voice input interface 223 may include, for example, a microphone for receiving audio signals, signal processing hardware, signal processing software, speech detection software, voice identification software, any other suitable hardware or software for processing voice input, or any combination thereof. In some embodiments, voice input interface 223 includes an audio interface that includes a microphone or other sensor that receives audio input and generates an electronic signal. In some embodiments, the audio input is received at an analog sensor, which provides an analog signal that is conditioned, sampled, and digitized to generate an audio file. The audio file may then be analyzed by interactive system 220. Voice input interface 223 may be configured to receive audio input at any time, when speech or other suitable audio signals are detected, when activated by interactive system 220 (e.g., command predictor 224, recommendation generator 225, or condition analyzer 226 thereof), in response to any other criterion, or any combination thereof. Interactive system 220 or voice input interface 223 thereof may include any suitable conditioning software or hardware for converting audio input to a stored audio file or electronic signal. For example, interactive system 220 or voice input interface 223 thereof may apply one or more filters (e.g., low-pass, high-pass, notch filters, or band-pass filters), amplifiers, decimators, or other conditionings to generate the audio file. In a further example, interactive system 220 or voice input interface 223 thereof may apply any suitable processing to a conditioned signal to generate an audio file such as compression, transformation (e.g., spectral transformation, wavelet transformation), normalization, equalization, truncation (e.g., in a time or spectral domain), any other suitable processing, or any combination thereof. Interactive system 220 or voice input interface 223 thereof may be configured to extract one or more keywords from the received voice input. For example, in some embodiments, the query application may identify words in speech, and select some of those words as keywords. Interactive system 220 or voice input interface 223 thereof may process words using any suitable word detection technique, speech detection technique, pattern recognition technique, signal processing technique, or any combination thereof. For example, interactive system 220 or voice input interface 223 thereof may compare a series of signal templates to a portion of an audio signal to find whether a match exists (e.g., whether a particular word is included in the audio signal). In a further example, interactive system 220 or voice input interface 223 thereof may store snippets (i.e., clips of short duration) of recorded audio during detected speech, and process the snippets. In some embodiments, the query application stores relatively large segments of speech (e.g., more than 10 seconds) as an audio file, and processes the file. In some embodiments, interactive system 220 or voice input interface 223 thereof may process speech to detect words by using a continuous computation. For example, a wavelet transform may be performed on speech in real time, providing a continuous computation of speech patterns (e.g., which could be compared to a reference to identify words). In some embodiments, interactive system 220 or voice input interface 223 thereof may detect words, as well as which user uttered the words (e.g., voice recognition) in accordance with the present disclosure.

Command predictor 224 is configured to predict a command that is (1) expected to be inputted based on a user's past behavior (e.g., from use information 290), (2) likely to be inputted based on a plurality of users' past behavior, (3) useful to the user based on one or more events, or (4) useful to the user as a way to gain experience with interactive system 220 using voice commands. In some embodiments, command predictor 224 retrieves the user's interaction history with interactive system 220 from user information 290 and analyzes it to identify patterns. For example, at particular times of day or night the user may watch particular channels or particular shows. The channel and time (e.g., start time, end time, duration, or combination thereof) may be stored in user information 290. In an illustrative example, for particular types of channels (e.g., music channels), the user may increase the volume as compared to the volume for watching television programs. User information 290 maintains watch history and remote control usage history for every interaction of the user with interactive system 220. In some embodiments, command predictor 224 determines a command based on input from condition analyzer 226, which is configured to identify one or more environmental or circumstance-based conditions relevant to the user. For example, during certain types of disturbances, (e.g., telephone call ring, doorbell ring, crying baby) the user might generally pause the currently displayed program, or mute the volume. The history of such interactions is stored in user information 290, and condition analyzer 226 identifies a condition that corresponds to the stored interactions. For example, condition analyzer 226 access external cues (e.g., telephone call ring, doorbell ring, or crying baby) in the room and predicts a command of use to the user. Command predictor 224 may predict any suitable type of command such as, for example, changing a channel, changing a volume, muting a volume, pausing/playing a program, rewinding/forwarding a program, exiting or stopping a program, initiating or starting a program, recording a program, displaying information about a program (e.g., a plot summary, a list of actors, ratings information), displaying information based on a program (e.g., related programs), setting an alarm, clearing an alarm, navigation-based commands (e.g., go to a billing page, go to an on-demand page), any other suitable command, or any combination thereof (e.g., both change a channel and decrease a volume). In an illustrative example, command predictor 224 may generate an interactive function prediction map for the user as illustrated in Table 2:

TABLE 2

Prediction map of illustrative functions.

| CONDITION | INTERACTIVE FUNCTION |
| --- | --- |
| After watching GOT on HBO | Change channel to Sky News |
| After tuning to music channel | Increase TV volume |
| On receiving a phone call | Pause the program, Mute the volume |
| On consuming content on a mobile device | Pause the program |
| At 9:00 pm | Open Netflix |
| On detecting lost proximity of user and remote | Pause the program |
| Lack of voice command usage | Any suitable function |
| Following a non-voice command | The just-inputted command |
| After a predetermined duration | Any suitable function |
| . . . | . . . |

As illustrated in Table 2, a condition may include program endings or beginnings, user behavior (e.g., receiving a phone call, nitrating with a mobile device, moving around), a time (e.g., a clock time), a duration of a lack of voice command usage, use of a non-voice command, any other suitable condition, or any combination thereof. In some embodiments, interactive system 220 generates, retrieves, or otherwise uses tabulated values to determine if a voice command notification should be displayed to the user or not. For example, interactive system 220 need not generate a voice command notification for commands that are regularly used and known by the user. To illustrate, interactive system 220 may consider the number of times a voice command is used for an interactive function as well as the last usage timestamp (e.g., which may be tabulated similar to arrangement of Table 1). If both of these values lie below certain thresholds then interactive system 220 generates a voice command notification. In some embodiments, interactive system 220 compares the usage of a remote control and usage of voice commands for one or more interactive functions. In some such embodiments, if the difference between the times of usage is greater than a threshold (e.g., with remote control usage on higher side), the system may generate a voice command notification.

Recommendation generator 225 is configured to determine and generate a recommendation for a voice command. The recommendation may be in the form of a notification, as illustrated by notifications 101 and 151 of FIG. 1. The recommendation may be based on which command is predicted by command predictor 224, which command is the most convenient or useful for the user, or a combination thereof. For example, recommendation generator 225 may identify voice commands will be the most convenient way for the user to achieve an interactive function at that moment (e.g., as compared to a using a remote control). In some embodiments, recommendation generator 225 highlights the reason in the notification to the user for using voice command. The highlight may include adding information about the device that is out of reach for the user, the detected event, or other suitable information. For example, recommendation generator may generate a notification that includes "Cannot find TV remote? Just say 'Volume Up' to increase the volume," or "Away from keyboard? Just say 'TV mute' to mute the TV."

Condition analyzer 226 is configured to detect, determine, identify, or otherwise analyze conditions that may affect a user's use of voice commands. In some embodiments, interactive system 220 or condition analyzer 226 thereof monitors or otherwise determines the position of one or more interactive devices (e.g., a remote control, a game controller, a keyboard, a trackball, a mobile phone, or other device), the position of the user (e.g., in the room or elsewhere), or both. For example, if the distance between user and the interactive device is more than a predetermined threshold, interactive system 220 or condition analyzer 226 identifies that it will be difficult for the user to grab the interactive device (e.g., the condition is "lack of proximity"). In some embodiments, interactive system 220 uses cameras to map and determine (e.g., calculate) the position of the user and the position of the interactive devices in the room (e.g., the room wherein interactive system 220 or components thereof reside). In some embodiments, interactive system 220 or condition analyzer 226 thereof determines the user's position based on tracking one or more peripheral devices such as, for example, a smart watch, fitness tracker, a pair of headphones, any other suitable peripheral device, or any combination thereof. In some embodiments, interactive system 220 or condition analyzer 226 thereof maps interactive devices through detected signals arising from electronic circuitry of the interactive device.

Condition analyzer 226 may include any suitable sensors, signal processing circuitry, or both to detect one more conditions. For example, condition analyzer 226 may include a system that interacts with a remote control or other interactive device to determine the interactive device's position. To illustrate, condition analyzer 226 may determine distance or position based on a signal (e.g., a latency in a returned signal, a signal strength, an attenuation of a signal, or changes thereof). In a further example, condition analyzer 226 may use image analysis to determine movement, distance, proximity, or changes thereof. In some embodiments, an interactive device or peripheral device may detect its own position and communicate position information to interactive system 220 using any suitable communications link (e.g., wireless, near-field, or optical transmission). In some embodiments, condition analyzer 226 retrieves information from condition information 270. In some embodiments, condition analyzer 226 detects one or more conditions and generates information to transmit to condition information 270 for storage.

In some embodiments, condition information 270 includes information about other users in proximity to the first user. For example, if two users are in proximity to interactive system 220, condition analyzer 226 may identify conditions wherein one user leaves and may generate a corresponding voice command recommendation (e.g., pause the program until they return to proximity, or increase the volume to reach the greater distance). In a further example, if one user is in proximity to interactive system 220, condition analyzer 226 may identify conditions wherein another user arrives and may generate a corresponding voice command recommendation (e.g., pause the program until they get situated).

In an illustrative example, interactive system 220 may generate a voice command suggestion (e.g., using recommendation generator 225) to the user having a "yes" or "no" answer. User information 290 may include template information, the user's history of interacting with templates, or both. In some embodiments, the yes/no question will take into consideration previous template usage of the user to generate the question. For example, interactive system 220 may have three templates for changing a channel "Go to channel <channel-name>," "Tune to channel <channel-name>," and "Jump to channel <channel-name>." Accordingly, interactive system 220 may generate different questions for same interactive function. For example, interactive system 220 may generate notifications such as "Would you like to go to channel Sky News?," "Would you like to tune to channel Sky News?," and "Would you like to jump to channel Sky News?" Based on which template the user is more familiar to considering the past query usage of the user, interactive system 220 will select the best template amongst the three options. In some embodiments, interactive system 220 may be communicatively coupled to a voice-activated home assistant to present the question to the user.

In some embodiments, interactive system 220 or a remote control includes a microphone that may not have support to be triggered by a 'wake word'. For example, the user may press a button on the remote control to input a voice command. In some embodiments, interactive system 220 triggers the microphone (e.g., for five seconds or any other suitable time) when it presents a suggestion to the user and is ready to receive the user's voice response. In some embodiments, microphone is not configured to be always active to receive voice input. For example, the microphone may need to be activated to receive and record a voice command. In some such circumstances, when interactive system 220 generates the voice command notification to the user, it also activates the microphone for a certain period (e.g., thirty seconds or any other suitable time) because the user is expected to use the voice command soon after receiving the notification.

Figure 3:
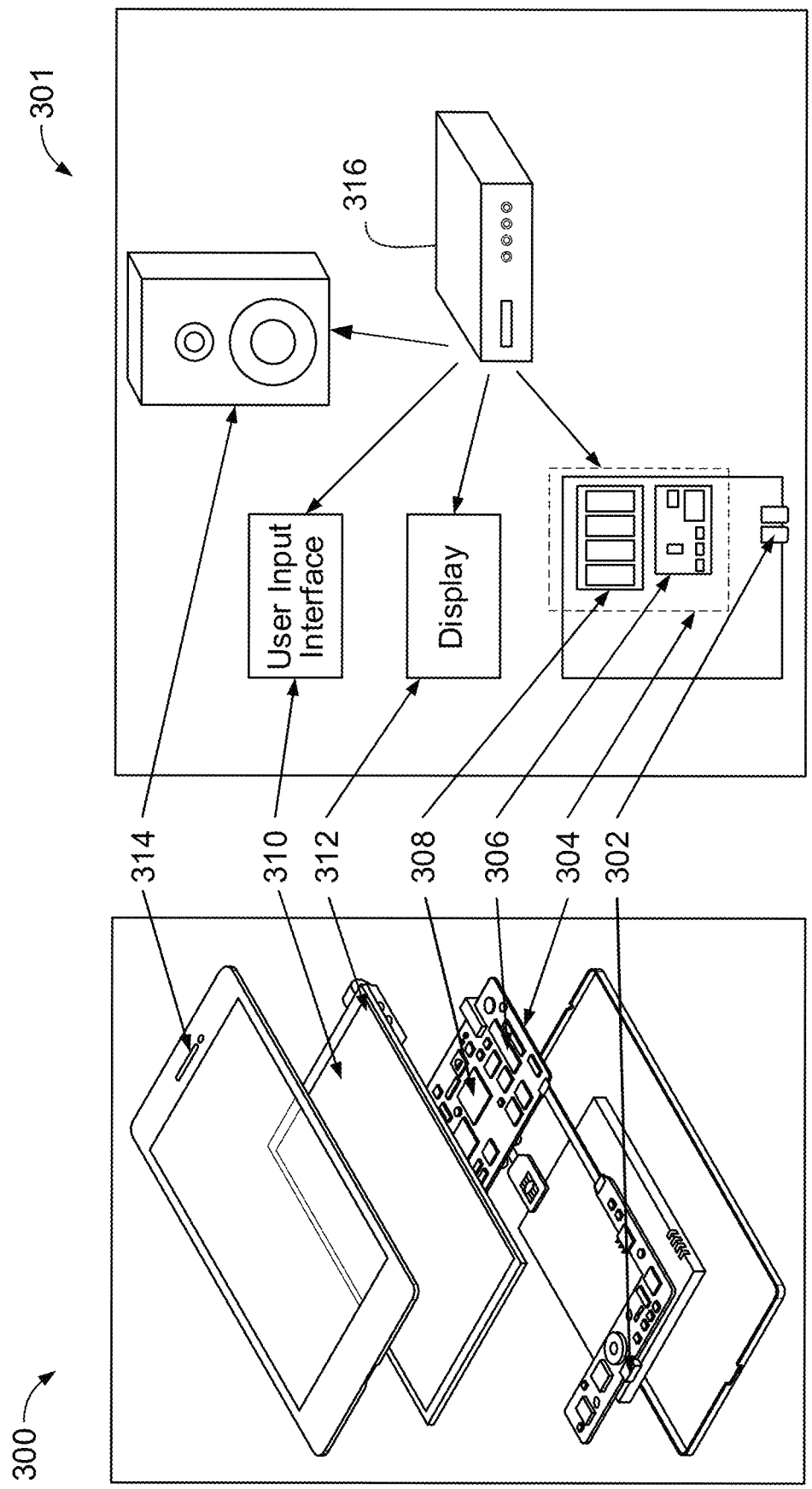
FIG. 3 is a block diagram of illustrative user devices, in accordance with some embodiments of the present disclosure.

FIG. 3 is a block diagram of illustrative user devices, in accordance with some embodiments of the present disclosure. User equipment system 301 may include set-top box 316 that includes, or is communicatively coupled to, display 312, audio equipment 314, and user input interface 310. In some embodiments, display 312 may include a television display or a computer display. In some embodiments, user input interface 310 is a remote-control device. Set-top box 316 may include one or more circuit boards. In some embodiments, the one or more circuit boards include processing circuitry, control circuitry, and storage (e.g., RAM, ROM, hard disk, removable disk, etc.). In some embodiments, circuit boards include an input/output path. Each one of user device 300 and user equipment system 301 may receive content and data via input/output (hereinafter "I/O") path 302. I/O path 302 may provide content and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths but are shown as a single path in FIG. 3 to avoid overcomplicating the drawing. While set-top box 316 is shown in FIG. 3 for illustration, any suitable computing device having processing circuitry, control circuitry, and storage may be used in accordance with the present disclosure. For example, set-top box 316 may be replaced by, or complemented by, a personal computer (e.g., a notebook, a laptop, a desktop), a network-based server hosting a user-accessible client device, a non-user-owned device, any other suitable device, or any combination thereof.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry is distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for an application stored in memory (e.g., storage 308). Specifically, control circuitry 304 may be instructed by the application to perform the functions discussed above and below. For example, the application may provide instructions to control circuitry 304 to generate the media guidance displays. In some implementations, any action performed by control circuitry 304 may be based on instructions received from the application.

In some client/server-based embodiments, control circuitry 304 includes communications circuitry suitable for communicating with an application server or other networks or servers. The instructions for carrying out the above-mentioned functionality may be stored on the application server. Communications circuitry may include a cable modem, an integrated-services digital network (ISDN) modem, a digital subscriber line (DSL) modem, a telephone modem, an ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other (described in more detail below).

Memory may be an electronic storage device such as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, solid state devices, quantum storage devices, gaming consoles, gaming media, any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, for example, may be used to supplement storage 408 or instead of storage 308.

A user may send instructions to control circuitry 304 using user input interface 310. User input interface 310, display 312, or both may include a touchscreen configured to provide a display and receive haptic input. For example, the touchscreen may be configured to receive haptic input from a finger, a stylus, or both. In some embodiments, user device 300 may include a front-facing screen and a rear-facing screen, multiple front screens, or multiple angled screens. In some embodiments, user input interface 310 includes a remote-control device having one or more microphones, buttons, keypads, any other components configured to receive user input, or combinations thereof. For example, user input interface 310 may include a handheld remote-control device having an alphanumeric keypad and option buttons. In a further example, user input interface 310 may include a handheld remote-control device having a microphone and control circuitry configured to receive and identify voice commands and transmit information to set-top box 316.

Audio equipment 314 may be provided as integrated with other elements of each one of user device 300 and user equipment system 301 or may be stand-alone units. The audio component of videos and other content displayed on display 312 may be played through speakers of audio equipment 314. In some embodiments, the audio may be distributed to a receiver (not shown), which processes and outputs the audio via speakers of audio equipment 314. In some embodiments, for example, control circuitry 304 is configured to provide audio cues to a user, or other audio feedback to a user, using speakers of audio equipment 314. Audio equipment 314 may include a microphone configured to receive audio input such as voice commands and speech (e.g., including voice queries). For example, a user may speak letters or words that are received by the microphone and converted to text by control circuitry 304. In a further example, a user may voice commands that are received by the microphone and recognized by control circuitry 304.

An application (e.g., for managing voice queries) may be implemented using any suitable architecture. For example, a stand-alone application may be wholly implemented on each one of user device 300 and user equipment system 301. In some such embodiments, instructions for the application are stored locally (e.g., in storage 308), and data for use by the application is downloaded on a periodic basis (e.g., from an out-of-band feed, from an Internet resource, or using another suitable approach). Control circuitry 304 may retrieve instructions for the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected. An application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and nonvolatile computer memory or storage devices such as a hard disk, floppy disk, USB drive, DVD, CD, media card, register memory, processor cache, Random Access Memory (RAM), etc.

In some embodiments, the application is a client/server-based application. Data for use by a thick or thin client implemented on each one of user device 300 and user equipment system 301 is retrieved on demand by issuing requests to a server remote from each one of user device 300 and user equipment system 301. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on user device 300. This way, the processing of the instructions is performed remotely by the server while the resulting displays, which may include text, a keyboard, or other visuals, are provided locally on user device 300. User device 300 may receive inputs from the user via input interface 310 and transmit those inputs to the remote server for processing and generating the corresponding displays. For example, user device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to user device 300 for presentation to the user.

In some embodiments, the application is downloaded and interpreted or otherwise run by an interpreter or virtual machine (e.g., run by control circuitry 304). In some embodiments, the application may be encoded in the ETV Binary Interchange Format (EBIF), received by control circuitry 304 as part of a suitable feed, and interpreted by a user agent running on control circuitry 304. For example, the application may be an EBIF application. In some embodiments, the application may be defined by a series of JAVA-based files that are received and run by a local virtual machine or other suitable middleware executed by control circuitry 304.

In some embodiments, user device 300, illustrated as a wireless-enabled device, may be coupled to a communications network (e.g., connected to the Internet). For example, user device 300 may be coupled to a communications network via a communications path (e.g., which may include an access point). In some embodiments, user equipment system 301 may be a computing device coupled to a communications network via a wireless or wired connection (e.g., a LAN, or any other suitable communications link). A communications network may be one or more networks including the Internet, a mobile phone network, mobile voice or data network (e.g., a 4G or LTE network), cable network, public switched telephone network, or other types of communications network or combinations of communications networks. Communications paths may include one or more communications paths, such as a satellite path, a fiber-optic path, a cable path, a path that supports Internet communications, free-space connections (e.g., for broadcast or other wireless signals), or any other suitable wired or wireless communications path or combination of such paths. User device 300, user equipment system 301, or both may communicate directly with each other via communications paths, such as those described above, as well as other short-range point-to-point communications paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. Devices may also communicate with each other directly through an indirect path via a communications network.

In some embodiments, communications between user device 300, user equipment system 301, or both and a network device (e.g., a server, an applications server, a database) may be exchanged over one or more communications paths. A plurality of network entities may exist and be in communication with user device 300, user equipment system 301, or both. In some embodiments, a network device implements an application that communicates with instances of applications at many user devices (e.g., user device 300 or user equipment system 301).

In some embodiments, the network device includes one or more types of stored information, including, for example, entity information, metadata, content, historical communications and search records, user preferences, user profile information, advertisement information, any other suitable information, or any combination thereof that may be retrieved by user device 300, user equipment system 301, or both. The network device may include an applications-hosting database or server, plug-ins, a software developers kit (SDK), an applications programming interface (API), or other software tools configured to provide software (e.g., as downloaded to a user device), run software remotely (e.g., hosting applications accessed by user devices), or otherwise provide applications support to applications of user device 300. In some embodiments, information from a network device is provided to user device 300 or user equipment system 301 using a client/server approach.

In some embodiments, an application may be implemented on user device 300, user equipment system 301, or both. For example, the application may be implemented as software or a set of executable instructions, which may be stored in storage 308 of user device 300, user equipment system 301, or both and executed by control circuitry of the respective devices. For example, an application may be implemented partially as a client application on user device 300 and partially on a remote server as a server application running on control circuitry of the remote server (e.g., control circuitry of a network device). When executed by control circuitry of the remote server, the application may instruct the control circuitry to generate a display and transmit the generated display to user device 300. The server application may instruct the control circuitry of the remote device to transmit data for storage on user device 300. The client application may instruct control circuitry of the receiving user device to generate the application displays.

In some embodiments, user device 300, user equipment system 301, or both, are part of a cloud-based arrangement. The cloud provides access to services, such as information storage, advertising, shopping, searching, messaging, or social networking services, among other examples, as well as access to any content described above, for user devices. Services can be provided in the cloud through cloud-computing service providers, or through other providers of online services. For example, the cloud-based services can include a storage service, a sharing site, a social networking site, a search engine, or other services via which user-sourced content is distributed for viewing by others on connected devices. These cloud-based services may allow a user device to store information to the cloud and to receive information from the cloud rather than storing information locally and accessing locally stored information. Cloud resources may be accessed by a user device using, for example, a web browser, a messaging application, a social media application, an authentication application, an application requiring authentication, a desktop application, a mobile application, any other suitable application, or any combination of applications.

Figure 4:
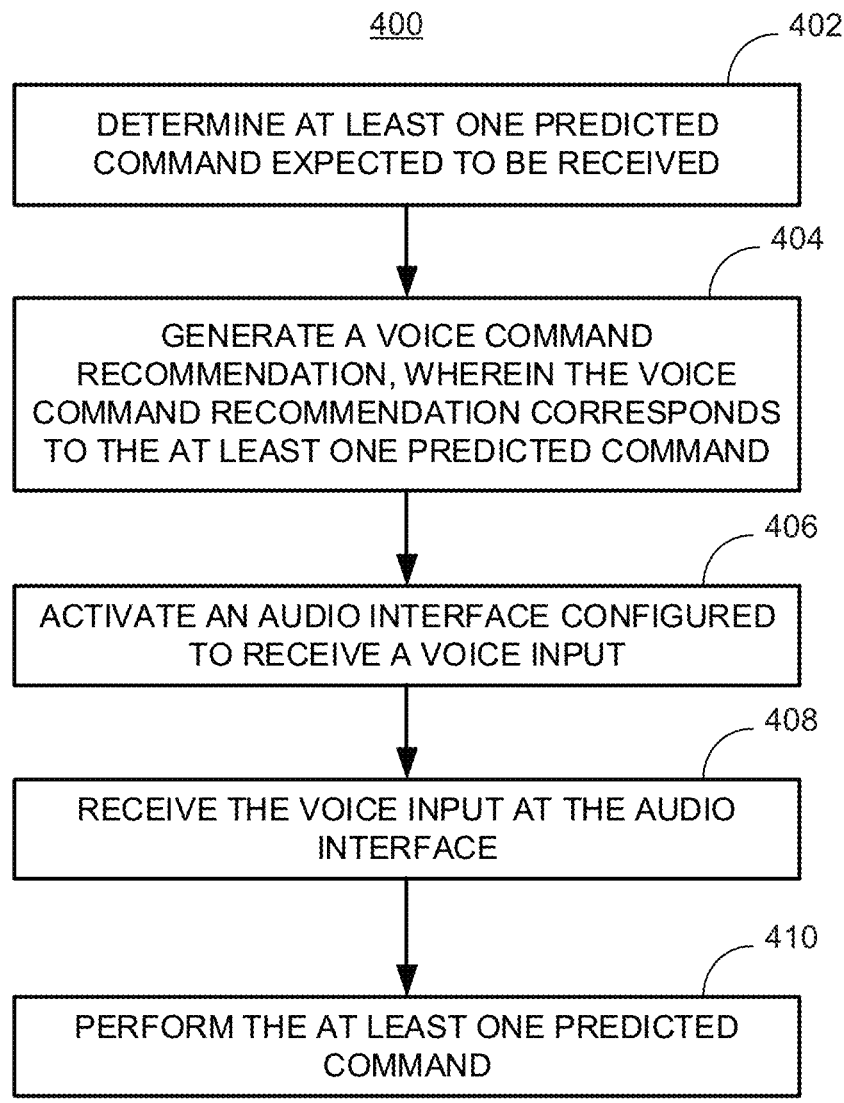
FIG. 4 is a flowchart of an illustrative process for generating a voice command recommendation, in accordance with some embodiments of the present disclosure.

FIG. 4 is a flowchart of an illustrative process 400 for generating a voice command recommendation, in accordance with some embodiments of the present disclosure. In some embodiments, as described below, process 400 may be performed by an application implemented on any suitable hardware. For example, an application may perform process 400, implemented on any suitable hardware such as interactive system 220 of FIG. 2, user device 300 of FIG. 3, user equipment system 301 of FIG. 3, any other suitable device, or any combination thereof.

Step 402 includes the application determining at least one predicted command expected to be received. The application may determine the at least one predicted command at a predetermined time, in response to an event, based on one or more conditions or triggers, based on user behavior, or a combination thereof. In an illustrative example, step 402 may be performed by interactive system 220 or command predictor 224 thereof.

In some embodiments, at step 402, the application determines the at least one predicted command based on historical information of the user's viewing behavior, command history, preferences, any other suitable information corresponding to the user, or any combination thereof. For example, the application may store or retrieve information such as a time history of commands (e.g., voice and non-voice commands, or lack thereof), command history relative to viewing behavior (e.g., time of a command relative to a program start/stop time or other time marker), viewing history (e.g., which content is viewed and when), any other user information, or any combination thereof. In an illustrative example, at step 402 the application, as implemented by interactive system 220, may retrieve information from user information 290. In an illustrative example, at step 402, the application may retrieve historical use information from user information 290 that includes one or more received commands corresponding to the one or more events. In some embodiments, for example, the application may identify one or more time markers (e.g., stored in storage 308, user information 290, or both) and a corresponding action or command the user has initiated (e.g., and is likely to initiate again). For example, a database may include an entry having a time stamp of 9:00 µm and a corresponding action of "switching channel to PBS," which has occurred a total of N times. In some embodiments, the time stamp is included as a time marker (e.g., included with information for populating a grid of content listings). When the application detects a clock time of 9:00 pm (e.g., retrieved from clock/time information 280), the application may access the database to determine the corresponding command. For example, referencing display 100 of FIG. 1, the application may detect a time marker of 8:59 pm, and determine the command that corresponds to notification 101 (e.g., changing the channel). In some embodiments, for example, the application may identify one or more triggers based on user action (e.g., stored in storage 308, user information 290, or both), and a corresponding action or command the user has initiated. For example, a database may include an entry having a user action of "changing channels a predetermined number of times in a period" and a corresponding action of "navigate to an on-demand program listing," which has occurred a total of N times. In some embodiments, the action trigger is stored in memory (e.g., storage 308) accessible by the application. When the application detects that the user has changed the channel the predetermined number of times in the time period, the application may identify this trigger and access the database to determine the corresponding command. For example, the application may detect five channel changes in a minute, and determine a corresponding command of "navigate to an on-demand program listing." In some embodiments, the application may monitor the time duration between voice commands, the time since the last voice command, a number or frequency of voice commands, or a combination thereof. The application may determine a voice command suggestion to motivate the user to use or explore voice commands. The voice command suggestion may be a common command, a relatively simple command, a popular command, or any other command.

In an illustrative example, the application may determine that a current time corresponds to a predetermined time marker at step 402. The application may then, at step 402, determine the least one predicted command by retrieving preference information corresponding to the at least one predicted command (e.g., from user information 290) and identifying the at least one predicted command as being preferred for voice input based on preference information. In a further illustrative example, the application may identify a time marker based on historical display activity, historical received inputs, or both.

In some embodiments, at step 402, the application determines the at least one predicted command based on statistical information of a plurality of users' viewing behavior, command histories, preferences, any other suitable information corresponding to the plurality of users, or any combination thereof. The application may retrieve data from a database storing historical information (e.g., to extract a command), transmit data to a database storing historical information (e.g., to build a record of command-based activities), or both. For example, the application may store information for a plurality of users in a similar from as that described above for a single user. Further, the application may extract statistical information from the record of the plurality of users' interactions. To illustrate, the application may store information about which channels users primarily change to at certain times, and use the most popular (e.g., most frequent) command as a predicted command. In a further illustrative example, the application may determine that 60% of users increase the volume when changing to a music channel, and thus may predict the command "increase the volume" when the user changes the channel to a music channel (e.g., the channel change command being the trigger for the volume command). In an illustrative example, the application as implemented by interactive system 220, may retrieve information regarding a plurality of users from user information 290.

In some embodiments, at step 402, the application determines the at least one predicted command based on environmental factors, or other suitable circumstance information. In an illustrative example, at step 402, the application may identify one or more events corresponding to a viewing environment, and determine the at least one predicted command expected to be received, based at least in part on the one or more events. The application may retrieve data from a database storing condition information (e.g., to extract a command), transmit data to a database storing condition information (e.g., to build a record of condition-based activities), or both. In an illustrative example, the application as implemented by interactive system 220 may retrieve information from condition information 270. The application may retrieve information (e.g., from condition information 270) based on one or more devices, sensors, or other suitable sources. For example, the application may be configured to communicate signals to and from a remote control or other interactive device, a peripheral device, or any other suitable device, to determine the device's position. The application may determine one or more users' positions, one or more devices' positions, the presence of one or more users, the presence of one or more devices, one or more events, one or more actions performed on a device, any other suitable condition information, or any combination thereof. For example, the application may determine other users in proximity to a first user. For example, if two users are in proximity to the display device, the application may identify conditions wherein one user leaves and may generate a corresponding voice command recommendation (e.g., pause the program until they return to proximity, or increase the volume to reach the greater distance). In a further example, if one user is in proximity to the display device, the application may identify conditions wherein another user arrives and may generate a corresponding voice command recommendation (e.g., pause the program until they get situated after a predetermined time).

In an illustrative example, at step 402, the application may determine the at least one predicted command expected to be received by identifying one or more events, retrieving historical use information, and determining the at least one predicted command based on the one or more events and based on the historical use information. To illustrate, the application may identify a phone call ring, determine that the user normally mutes the volume of the television in response to phone calls, and determines a predicted command of "decrease volume."

Step 404 includes the application generating a voice command recommendation. The voice command recommendation corresponds to the at least one predicted command of step 402. In an illustrative example, the application as implemented by interactive system 220, may use recommendation generator 225 to perform 404. In an illustrative example, the application may generate a voice command recommendation at step 404 by causing a display device to modify a display to include a visual indicator corresponding to the voice command recommendation. The application may generate a recommendation in the form of a notification, as illustrated by notifications 101 and 151 of FIG. 1. The recommendation of step 404 may include a description of the voice-command, introductory language (e.g., a greeting or other softening language), illustrative voice responses that are recognized, a time limit for responding, context information (e.g., the trigger or reason for the recommendation, the time since the last voice command, an encouragement to try using voice commands), feedback (e.g., whether to provide such notifications, when to provide such notifications), any other suitable information, or any combination thereof. In some embodiments, the application constructs a notification that may include text, images, video, or a combination thereof based on the predicted command of step 402, information about the user (e.g., from user information 290), information about a condition or circumstance (e.g., from condition information 270), information about a content listing (e.g., a program title or thumbnail image), information about one or more other users (e.g., how popular the command is), reasons for using the voice command (e.g., speaking a single word replaces several keystrokes on a remote control), any other suitable information, or any combination thereof. In some embodiments, the application determines how to present the notification to the user. For example, the application may format a text box overlay, as illustrated by notifications 101 and 151 of FIG. 1, for display on a display device (e.g., using display generator 221). In a further illustrative example, the application may generate the voice command recommendation by causing an audio device (e.g., a speaker) to generate an audible indicator corresponding to the voice command recommendation. In a further example, the application may generate a voice query to the user by generating speech based on the notification and generating audio output on a speaker or other audio equipment (e.g., audio equipment 314). In some embodiments, the predicted command may correspond to a non-voice command or series of non-voice commands, for which there is no corresponding single voice command. In some such embodiments, the application may determine a simpler or otherwise more limited voice command that corresponds to the non-voice command to some suitable extent. For example, a predicted command may include a series of actions such as navigate to an on-demand screen, select a channel of on-demand content, and view descriptions of the content (e.g., based on a user's history of browsing content). The application may recommend a voice command only for navigating to the on-demand screen to facilitate a relatively more concise interaction with the user (e.g., especially if the user does not use voice commands frequently). In some embodiments, the application generates more than one voice command recommendation. For example, a notification may include one or more recommended voice commands to achieve one or more functions.

In an illustrative example, the predicted command of step 402 includes an action, and the voice command recommendation of step 404 includes a recommendation to the user to achieve that command. In some embodiments, the predicted command and the recommended voice command are the same. For example, in some such embodiments, steps 402 and 404 may be combined (e.g., command predictor 224 and recommendation generator 225 may be combined).

Step 406 includes the application activating an audio interface that is configured to receive a voice input. In some embodiments, the audio interface is always configured to receive audio input. In some embodiments, the audio interface is configured to receive audio input when a user provides an indication to a user input interface (e.g., by selecting a soft button on a touchscreen to begin audio recording). In some embodiments, the audio interface is configured to receive audio input in response to generating a voice command recommendation at step 404. In some embodiments, the audio interface is configured to receive audio input and begins recording when speech or other suitable audio signals are detected.

Step 408 includes the application receiving the voice input at the audio interface. In some embodiments, an audio interface (e.g., audio equipment 314, user input interface 310, or a combination thereof) may include a microphone or other sensor that receives audio input and generates an electronic signal. In some embodiments, the audio input is received at an analog sensor, which provides an analog signal that is conditioned, sampled, and digitized to generate an audio file. In some embodiments, the audio file is stored in memory (e.g., storage 308). The query application may include any suitable conditioning software or hardware for converting audio input to a stored audio file. For example, the application may apply one or more filters (e.g., low-pass, high-pass, notch filters, or band-pass filters), amplifiers, decimators, or other conditionings to generate the audio file. In a further example, the application may apply any suitable processing to a conditioned signal to generate an audio file such as compression, transformation (e.g., spectral transformation, wavelet transformation), normalization, equalization, truncation (e.g., in a time or spectral domain), any other suitable processing, or any combination thereof. In some embodiments, at step 408, the control circuitry may receive a voice command as an audio file stored in storage (e.g., storage 308), for further processing.

In some embodiments, the application may store snippets (i.e., clips of short duration) of received audio, and process the snippets. In some embodiments, the application stores relatively large segments of speech (e.g., more than 10 seconds) as an audio file, and processes the file. In some embodiments, the query application may process speech to detect words by using a continuous computation. For example, a wavelet transform may be performed on speech in real time, providing a continuous, if slightly time-lagged, computation of speech patterns (e.g., which could be compared to a reference to identify words). In some embodiments, the application may detect words, as well as which user uttered the words (e.g., voice recognition), in accordance with the present disclosure.

The application may receive voice input and process words at step 408 using any suitable word detection technique, speech detection technique, pattern recognition technique, signal processing technique, or any combination thereof. For example, the application may compare a series of signal templates to a portion of an audio signal to find whether a match exists (e.g., whether a particular word is included in the audio signal). In a further example, the application may apply a learning technique to better recognize words in voice commands. For example, the application may gather feedback from a user on a plurality of voice commands, and accordingly use past data as a training set for making recommendations of voice commands.

Step 410 includes the application performing the at least one predicted command. The application performs the at least one predicted command of step 402, or a portion thereof, in response to receiving the voice input. In some embodiments, the application may wait a predetermined time for a response (e.g., 30 seconds or any other suitable time), and then cease displaying the notification. For example, if no response (e.g., voice input) is detected or otherwise recognizable (e.g., the speech detection is not successful in identifying a recognized response), the application may cease presenting the notification, modify the notification with an indicator that the time limit is impending, modify the notification to increase visibility (e.g., change color, size, or contrast of the notification to receive attention from the user), generate an audio indicator (e.g., generate a beep, sound, or speech to alert the user), or any combination thereof. In some embodiments, the application does not perform the predicted command because no voice input was detected or recognized, a negative voice input was received (e.g., "no" or "exit"), or a condition or trigger has changed (e.g., a modified notification may be generated). The application may perform the at least one predicted command immediately in response to receiving suitable voice input, at a predetermined time (e.g., change the channel at 9:00 pm as illustrated by display 100 of FIG. 1), in response to an event occurrence, or at any other suitable time.

In an illustrative example, the application may determine a predicted command that includes changing the display from content corresponding to a first channel to content corresponding to a second channel at step 402, and may perform the at least one predicted command by displaying the content corresponding to the second channel at step 410.

In a further illustrative example, the application may determine a predicted command that includes changing a volume of an audio track associated with the display, and may perform the at least one predicted command by increasing or decreasing the volume of the audio track at step 410.

FIG. 5 shows a flowchart of illustrative process 500 for managing voice command interactions, in accordance with some embodiments of the present disclosure. In some embodiments, as described below, process 400 may be implemented on any suitable hardware such as interactive system 220 of FIG. 2, user device 300 of FIG. 3, user equipment system 301 of FIG. 3, any other suitable device, or any combination thereof. In an illustrative example, the system may implement an application to perform process 500 (e.g., similar to the application described in the context of FIG. 4).

Step 502 includes the system monitoring interactions, conditions, time, any other suitable information, or any combination thereof to identify triggers. For example, the system may monitor keystrokes, non-voice commands, voice commands, a current time, a time duration, events, activity on one or more devices, any other suitable activity or information, or any combination thereof. For example, the system may retrieve potential triggers or criteria from information 590, transmit usage data to information 590, or both. Information 590 may include, for example, user information 290, condition information 270, clock/time information 280, any other suitable information, or any combination thereof.

Step 504 includes the system determining whether a trigger has been detected. In some embodiments, the system determines whether one or more triggers has occurred, and in response to detecting a trigger, the system may proceed to step 506 to determine a command. The system may monitor for triggers continuously, at intervals, in response to receiving input, or at any other suitable times.

Step 506 includes the system determining a command based on the detected trigger of step 502. In some embodiments, the system retrieves a command from information 590 based on the detected trigger at step 504. The command may correspond to the trigger based on any suitable criteria including, for example, a relationship in a database.

Step 508 includes the system generating a notification based on the command of step 506. The system may determine a recommended voice command, and generate a visual or audio notification to the user (e.g., using a display device or audio device), at step 508.

Step 510 includes the system activating an interface (e.g., an audio interface). The system may perform step 510 before, after, or at the same time as step 508. For example, the system may perform step 510 in response to a trigger being detected at step 504, retrieval of information from information 590, generation of the notification at step 508, or at any other suitable time.

Step 512 includes the system determining whether a response has been detected at the interface activated at step 510. The system may monitor the interface for a predetermined period of time, until a response is detected, until an event occurs (e.g., any command is received, voice or non-voice), any other suitable duration, or any combination thereof. For example, the system may process signals received at the interface using a speech detection technique. When the system identifies a recognizable voice input, the system may proceed to step 514 to response to the command.

Step 514 includes the system performing the command corresponding to the notification of step 508. The system may perform any suitable function at step 514 including changing a channel, changing or (un)muting a volume, turning a device on or off, pausing or playing a program, rewinding or forwarding a program, changing a display or display setting, any other suitable function, or any combination thereof.

Step 516 includes the system determining whether to modify, update, or replace the notification. For example, if at step 512, no response is detected, the system may determine whether to modify the notification at step 516. For example, the system may determine not to modify the system and return to monitoring interactions at step 502. In a further example, the system may determine to modify, update, or replace the notification of step 508 to urge the user to interact with the system, remind the user of the notification, or otherwise indicate the lack of recognizable and actionable voice response.

Step 518 includes the system storing suitable information based on interactions during or in the context of process 500. For example, a record of the performed command, lack of voice response, trigger detected, time information associated with any aspect of process 500, any other suitable information, or any combination thereof, may be stored in information 590 for inclusion in historical information (e.g., for later determination of commands and usage behavior). Accordingly, the system can construct a record of the user's behavior and preferences for future command predictions and voice command recommendations.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method comprising:
   generating for display a content item;
   retrieving historical use information from a database storing user activity history;
   identifying, based on the historical use information, a time of an expected voice input expected to be received at a play position of the content item currently being presented, wherein a previous voice input was previously received at the play position that changes presentation of content from the historical use information;
   identifying that ambient noise is present at the time of the expected voice input and that the ambient noise disturbs consumption of the content item currently being presented;
   in response to identifying that the ambient noise is present at the time of the expected voice input, generating for display text indicative of the expected voice input; and
   executing a command corresponding to the expected voice input.

2. The method of claim 1, wherein the identifying that the ambient noise is present at the time of the expected voice input comprises detecting at least one of a phone ring, a doorbell ring, or an alarm that disturbs consumption of the content item.

3. The method of claim 1, wherein the identifying that the ambient noise is present at the time of the expected voice input comprises determining that the ambient noise inhibits audio capture of the expected voice input.

4. The method of claim 1, wherein the content item is a first content item, and wherein the executing the command corresponding to the expected voice input comprises changing display of the first content item to display of a second content item.

5. The method of claim 4, further comprising:
   executing the command based on approval of the text indicative of the expected voice input, wherein the executing the command based on the approval comprises generating for display the second content item in response to receiving an input indicating approval of the text indicative of the expected voice input.

6. The method of claim 1, wherein:
   the text indicative of the expected voice input comprises a request for an affirmative input corresponding to the expected voice input; and
   the command is executed in response to receiving the affirmative input corresponding to the expected voice input.

7. The method of claim 1, further comprising determining a distance between a position of a user device and a position of an audio interface for receiving the expected voice input.

8. The method of claim 7, further comprising determining, based on the distance, a reduced proximity between the user device and the audio interface for receiving the expected voice input.

9. The method of claim 1, wherein the generating for display the text indicative of the expected voice input comprises generating for display text highlighting the ambient noise and the play position of the content item.

10. The method of claim 1, further comprising activating an audio interface for a predetermined time period subsequent to the generating for display the text indicative of the expected voice input.

11. A system comprising:
    display circuitry configured to generate for display a content item; and
    control circuitry configured to:
      retrieve historical use information from a database storing user activity history;
      identify, based on the historical use information, a time of an expected voice input expected to be received at a play position of the content item currently being presented, wherein a previous voice input was previously received at the play position that changes presentation of content from the historical use information;
      identify that ambient noise is present at the time of the expected voice input and that the ambient noise disturbs consumption of the content item currently being presented;
      in response to identifying that the ambient noise is present at the time of the expected voice input, generate for display text indicative of the expected voice input; and
      execute a command corresponding to the expected voice input.

12. The system of claim 11, wherein the control circuitry, when identifying that the ambient noise is present at the time of the expected voice input, is configured to detect at least one of a phone ring, a doorbell ring, or an alarm that disturbs consumption of the content item.

13. The system of claim 11, wherein the control circuitry, when identifying that the ambient noise is present at the time of the expected voice input, is configured to determine that the ambient noise inhibits audio capture of the expected voice input.

14. The system of claim 11, wherein the content item is a first content item, and wherein the control circuitry is configured to execute the command corresponding to the expected voice input by changing display of the first content item to display of a second content item.

15. The system of claim 14, wherein the control circuitry is further configured to:
execute the command based on approval of the text indicative of the expected voice input by generating for display the second content item in response to receiving an input indicating approval of the text indicative of the expected voice input.

16. The system of claim 11, wherein:
the text indicative of the expected voice input comprises a request for an affirmative input corresponding to the expected voice input; and
the control circuitry is configured to execute the command in response to receiving the affirmative input corresponding to the expected voice input.

17. The system of claim 11, wherein the control circuitry is further configured to:
determine a distance between a position of a user device and a position of an audio interface for receiving the expected voice input.

18. The system of claim 17, wherein the control circuitry is further configured to:
determine, based on the distance, a reduced proximity between the user device and the audio interface for receiving the expected voice input.

19. The system of claim 11, wherein the control circuitry, when the generating for display the text indicative of the expected voice input, is configured to generate for display text highlighting the ambient noise and the play position of the content item.

20. The system of claim 11, wherein the control circuitry is further configured to:
activate an audio interface for a predetermined time period subsequent to the generating for display the text indicative of the expected voice input.

* * * * *